(12) United States Patent
Zhou et al.

(10) Patent No.: US 6,841,955 B2
(45) Date of Patent: Jan. 11, 2005

(54) MOVING BODY DRIVE CONTROL DEVICE

(75) Inventors: Zhenjia Zhou, Kanagawa-ken (JP); Osamu Kawanobe, Kanagawa-ken (JP)

(73) Assignee: Ohi Seisakusho Co., Ltd., Yokohama (JP)

( * ) Notice: Subject to any disclaimer, the term of this patent is extended or adjusted under 35 U.S.C. 154(b) by 0 days.

(21) Appl. No.: 10/210,284

(22) Filed: Aug. 1, 2002

(65) Prior Publication Data
US 2003/0025469 A1 Feb. 6, 2003

(30) Foreign Application Priority Data
Aug. 1, 2001 (JP) .................................. P2001-233414

(51) Int. Cl.$^7$ ................................................ H02P 7/68
(52) U.S. Cl. .................. 318/112; 318/87; 318/293; 318/376
(58) Field of Search .............................. 318/34, 53–57, 318/59, 60, 63, 65, 66, 69, 70, 77, 83, 86, 87, 111, 112, 268–272, 293, 375, 376

(56) References Cited

U.S. PATENT DOCUMENTS

| | | | | | |
|---|---|---|---|---|---|
| 3,673,473 A | * | 6/1972 | Werner | ........................ | 318/7 |
| 3,783,359 A | * | 1/1974 | Malkiel | ....................... | 318/254 |
| 3,854,676 A | * | 12/1974 | Fischer et al. | ........... | 242/334.4 |
| 3,970,906 A | * | 7/1976 | Komatsubara | ................ | 318/7 |
| 4,041,362 A | * | 8/1977 | Ichiyanagi | ................... | 318/269 |
| 4,221,344 A | * | 9/1980 | Lohest | .................... | 242/477.6 |
| 4,953,044 A | * | 8/1990 | Van Pelt et al. | ......... | 360/73.09 |
| 5,490,638 A | * | 2/1996 | Driftmyer et al. | .......... | 242/421 |
| 5,831,403 A | * | 11/1998 | Kanki et al. | ................ | 318/286 |

* cited by examiner

Primary Examiner—Bentsu Ro
(74) Attorney, Agent, or Firm—Brenda O. Holmes; Kilpatrick Stockton LLP

(57) ABSTRACT

A moving body drive control device characterized by mutually balancing a magnitude of driving force TK and a magnitude of braking force TB, both of the forces being generated by a motor, to approximate a moving speed of a moving body 100 to a target speed highly precisely without being affected by a disturbance and the like in a state where the drive control device always applies at least any force of the driving force TK and the braking force TB to the moving body 100 to always apply a driving load thereto.

5 Claims, 14 Drawing Sheets

MOVING BODY DRIVE CONTROL DEVICE

BACKGROUND OF THE INTENTION

1. Field of the Invention

The present invention relates to a moving body drive control device for controlling drive of a moving body, for example, such as a vehicular backdoor, so at to operate the moving body to be moved at a specified speed when driven by use of a motor.

2. Description of the Related Art

There has been proposed an operation technology of moving a moving body such as a vehicular backdoor and a slide door by use of a motor as a drive source to open/close the moving body automatically. In the case of opening/closing the backdoor, the slide door and the like as described above automatically, it is required that a moving speed thereof be controlled at a specified speed to perform an opening/closing operation thereof smoothly.

In the case of operating to move the moving body by use of the motor as a drive source, the moving speed of the moving body is changed in accordance with a degree of energization from a battery to the motor. Therefore, control for the moving speed of the moving body is usually carried out by performing pulse width modulation (PWM) for pulse signals used for the energization from the battery to the motor.

Incidentally, in such a case of operating to move a slide door of a vehicle parked on a slope, self-weight of the slide door as a moving body affects the moving operation more than when the vehicle is parked on the level ground. Therefore, even if a duty ratio of the pulse signals for the energization from the battery to the motor is controlled at the lowest level by the PWM control, the moving speed of the moving body exceeds a target speed in some cases. Moreover, in the backdoor opening/closing in the vertical direction of the vehicle, due to a structure thereof, a closing operation thereof is greatly affected by the self-weight of the backdoor, and an opening operation thereof is affected by biasing force from an biasing member such as a gas stay. Therefore, even if the duty ratio of the pulse signals for the energization from the battery to the motor is set at the lowest level by the PWM control, the moving speed of the moving body sometimes exceeds the target speed.

In consideration of the points as described above, for example, the gazette of Japanese Patent Laid-Open No. Hei 10(1998)-246061 proposes a technology of approximating the moving speed of the moving body to the target speed, in which the motor is set in a regenerative braking state to apply braking force to the moving body when the moving speed of the moving body cannot be lowered to the target speed only by the PWM control for the motor. In this case, when the braking force applied to the moving body becomes too large, the moving speed of the moving body is drastically lowered, and thus a smooth motion of the moving body will be hindered.

Accordingly, the gazette of Japanese Patent Laid-Open No. Hei 10(1998)-246061 proposes the control for the moving speed of the moving body, in which the regenerative braking state and a free state where the regenerative braking state is released are alternately set when the braking force is applied to the moving body by the regenerative brake of the motor, and thus the braking force applied to the moving body is adjusted not to be too large.

SUMMARY OF THE INVENTION

However, when the braking force applied to the moving body is adjusted by alternately setting the regenerative braking state and the free state as described above, since no driving load is applied to the moving body in the free state, the moving body is apt to be affected by a disturbance such as a vibration and a wind, and thus a problem of difficulty in controlling the moving speed of the moving body stably has been caused.

Moreover, in the case of individually performing the control of enhancing the moving speed by applying driving force to the moving body and the control of lowering the moving speed of the moving body by applying the braking force to the moving body, the number of revolutions of the motor is greatly changed with respect to torque change thereof. Particularly, in a state close to the target speed, when slight braking force is to be applied to the moving body by the regenerative brake, only slight change of the regenerative brake torque will greatly change the number of revolutions of the motor.

Therefore, there has been another problem that it becomes difficult to control the moving speed of the moving body highly precisely.

The present invention was created in consideration of the conventional circumstance as described above. The object of the present invention is to provide a moving body drive control device capable of controlling the moving speed of the moving body stably without being affected by the disturbance and capable of controlling the moving speed of the moving body highly precisely.

A first aspect of the present invention is a moving body drive control device for controlling drive of a moving body driven by a motor to move the moving body at a specified target speed, the drive control device comprising: a controller for mutually adjusting a magnitude of driving force and a magnitude of braking force to approximate a moving speed of the moving body to the target speed in a state where the motor always applies at least any of the driving force and the braking force to the moving body to always apply a driving load to the moving body.

In the moving body drive control device according to the first aspect, since the driving load is always applied to the moving body, the disturbance can be restrained from affecting the moving body. Moreover, the magnitude of the driving force by the motor and the magnitude of the braking force thereby are balanced, and thus the moving speed of the moving body is controlled. Therefore, in comparison with the case of performing the drive control and the brake control separately and individually, the change in the number of revolutions of the motor with respect to the torque change thereof can be reduced. Accordingly, in accordance with this moving body drive control device, the moving speed of the moving body can be controlled extremely appropriately. Note that the driving load here includes both a load applied to the moving body by the driving force of the motor and a load applied to the moving body by the braking force of the motor.

A second aspect of the present invention is the moving body drive control device according to the first aspect, wherein one motor is provided as the motor for driving the moving body, and the controller mutually adjusts the magnitude of the driving force and the magnitude of the braking force to approximate the moving speed of the moving body to the target speed in a state where the one motor alternately applies the driving force and the braking force to the moving body to always apply the driving load to the moving body.

In the moving body drive control device according to the second aspect, the one motor alternately applies the driving force and the braking force to the moving body to realize the state where the driving load is always applied to the moving body. Accordingly, by use of the one motor, the moving speed of the moving body can be controlled appropriately, and thus the reduction in device cost can be realized. Note that, when switching from a period of applying the driving force to the moving body to a period of applying the braking force to the moving body, a moment when no driving load is applied to the moving body will exist. However, this moment is an extremely short time and ignorable. Namely, the state here where the driving load is always applied to the moving body is referred to as a state where the driving load is always applied to the moving body, the state excluding such switching timing as described above.

Moreover, a third aspect of the present invention is the moving body drive control device according to the first aspect, wherein a plurality of motors are provided as the motor for driving the moving body, and the controller mutually adjusts the magnitude of the driving force and the magnitude of the braking force to approximate an opening/closing speed of the moving body to the target speed in a state where at least one of the plurality of motors applies the driving force to the moving body, and at least one of others applies the braking force to the moving body simultaneously, to always apply the driving load to the moving body.

In the moving body drive control device according to the third aspect, the state is set, where the plurality of motors apply the driving force and the braking force to the moving body, respectively, and thus the driving load is always applied to the moving body. Therefore, the moving speed of the moving body can be controlled with extremely high precision.

A fourth aspect of the present invention is the moving body drive control device according to the first aspect, wherein input pulses for the motor are subjected to pulse width modulation control to adjust the magnitude of the driving force.

In the moving body drive control device according to the fourth aspect, the magnitude of the driving force applied to the moving body is adjusted by the pulse width modulation control for the input pulses for the motor. Therefore, the moving speed of the moving body can be controlled with higher precision.

Moreover, a fifth aspect of the present invention is the moving body drive control device according to the first aspect, wherein input pulses for the motor are subjected to pulse width modulation control to adjust the magnitude of the braking force.

In the moving body drive control device according to the fifth aspect, the magnitude of the braking force applied to the moving body is adjusted by the pulse width modulation control for the input pulses for the motor. Therefore, the moving speed of the moving body can be controlled with higher precision.

DESCRIPTION OF THE PREFERRED EMBODIMENT

Hereinafter, description will be made in detail for an embodiment of the present invention with reference to the drawings.

First, prior to concrete description of the embodiment to which the present invention is applied, a basic principle of the present invention will be described.

Figure 1:
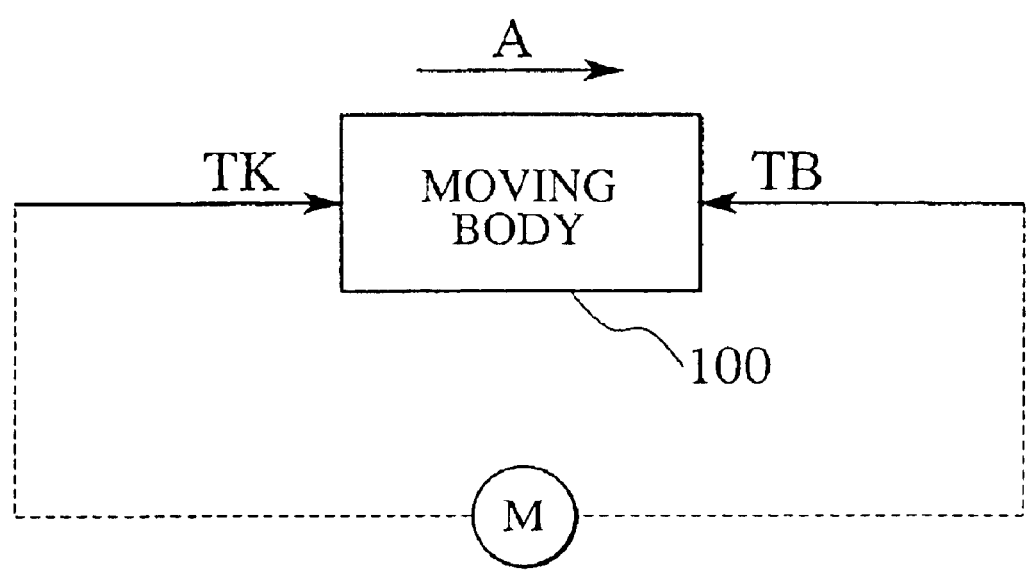
FIG. 1 is a schematic diagram conceptually showing a basic principle of the present invention.

Description will be conceptually made for the basic principle of the present invention with reference to FIG. 1. To a moving body 100, driving force TK and braking force TB by a motor M are simultaneously applied or alternately applied while being switched in a short time, and thus a state is set, where a driving load is always applied to the moving body 100. Moreover, in the present invention, a magnitude of the driving force TK and a magnitude of the braking force TB, which are applied to the moving body 100 by the motor M, are mutually balanced, and thus drive of the moving body 100 is controlled so that the moving body 100 can move in a direction of an arrow A in FIG. 1 at a specified target speed.

When the drive of the moving body 100 is controlled, if neither the driving force TK nor the braking force TB is applied to the moving body 100, that is, if a free state is present, where the driving load by the motor M is not applied thereto, then the moving body 100 is apt to be affected by a disturbance such as a vibration and a wind. Consequently, it becomes difficult to control the drive of the moving body 100 so as to move the moving body 100 at the specified target speed.

Figure 2A:
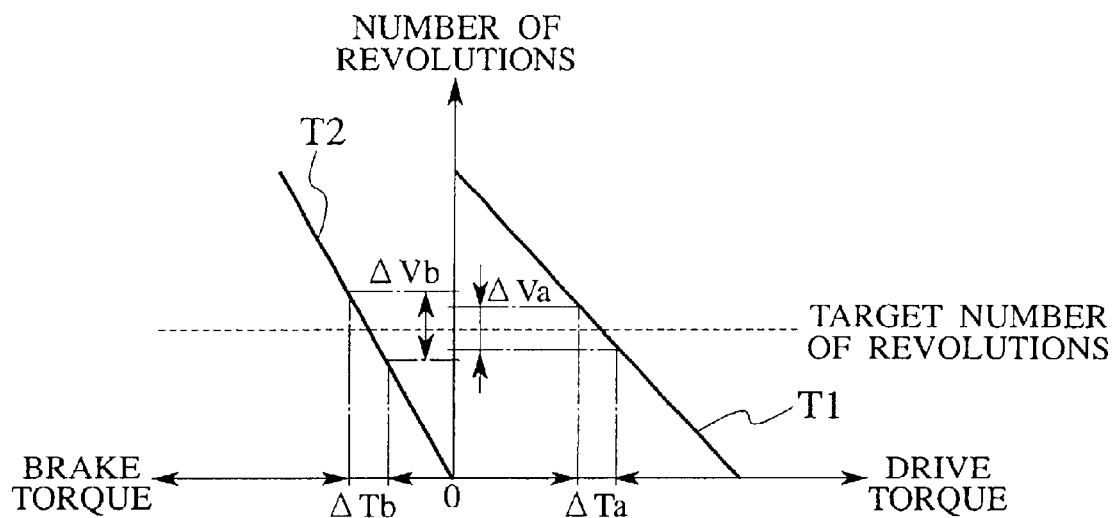
FIG. 2A is an explanatory diagram of the basic principle of the present invention, particularly showing change of the number of revolutions of a motor with respect to torque change thereof when drive control and brake control for a moving body are carried out separately.

On the contrary, in the present invention, the moving body 100 is set in the state where the driving load is always applied thereto, and thus the moving body 100 is set hard to be affected by the disturbance to enable stable control for the moving speed of the moving body 100. Moreover, in the case of separately performing the drive control of applying the driving force TK by the motor M to the moving body 100 and the brake control of applying the braking force TB by the motor M to the moving body 100, the drive control is performed on a driving torque line T1 shown in FIG. 2A, and the brake control is performed on a braking torque line T2 shown in FIG. 2A. Then, in the drive control, change ΔVa of the number of revolutions of the motor M with respect to change ΔTa of the driving torque thereof is large. Moreover, in the brake control, change ΔVb of the number of revolutions of the motor M with respect to change ΔTb of the braking torque thereof is large. Therefore, slight torque change changes the number of revolutions of the motor M greatly, and thus difficulty is caused in highly precise drive control of the moving body 100.

Figure 2B:
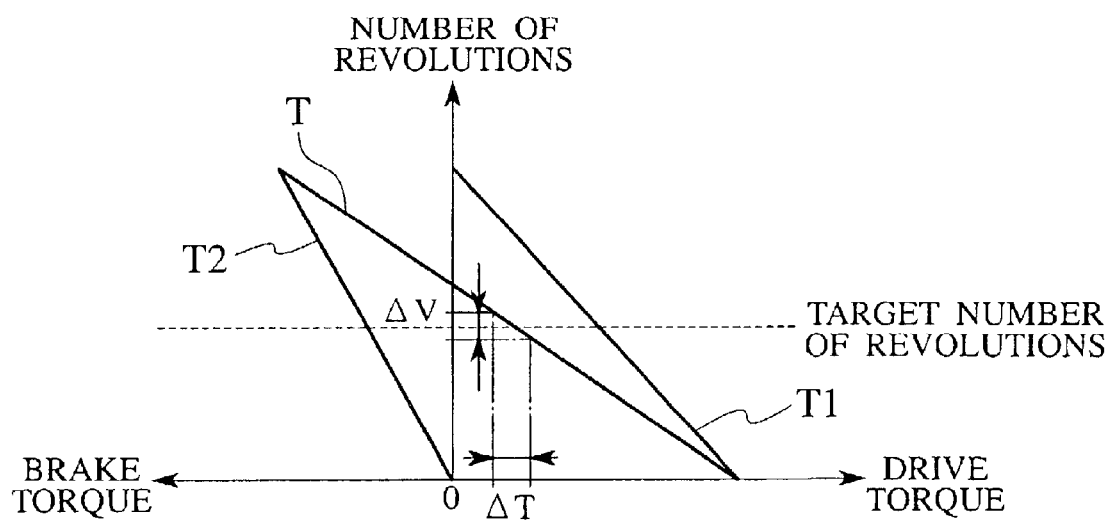
FIG. 2B is a diagram showing change of the number of revolutions of the motor with respect to the torque change thereof in the case of applying the present invention.

On the contrary, in the present invention, the magnitude of the driving force TK and the magnitude of the braking force TB, which are applied to the moving body 100 by the motor M, are mutually balanced, and thus the moving body 100 is moved at a specified moving speed. Accordingly, as shown in FIG. 2B, the drive control of the moving body 100 is performed on a composite torque line T obtained by compositing the driving torque line T1 and the braking torque line T2. Therefore, change of the number of revolutions ΔV of the motor M with respect to torque change ΔT thereof is reduced as compared with the above-described case of separately performing the drive control and the brake control. In this case, the torque change ΔT corresponds to the above-described driving torque change ΔTa and the braking torque change ΔTb. From the above, it is made possible to control the drive of the moving body 100 highly precisely.

The present invention as described above is applied to, for example, a device for automatically opening/closing the backdoor provided on the rear of the vehicle by means of the drive of the motor. Hereinafter, description will be made for one concrete example where the present invention is applied to the automatic opening/closing device of the backdoor with reference to FIGS. 3 to 10.

Figure 3:
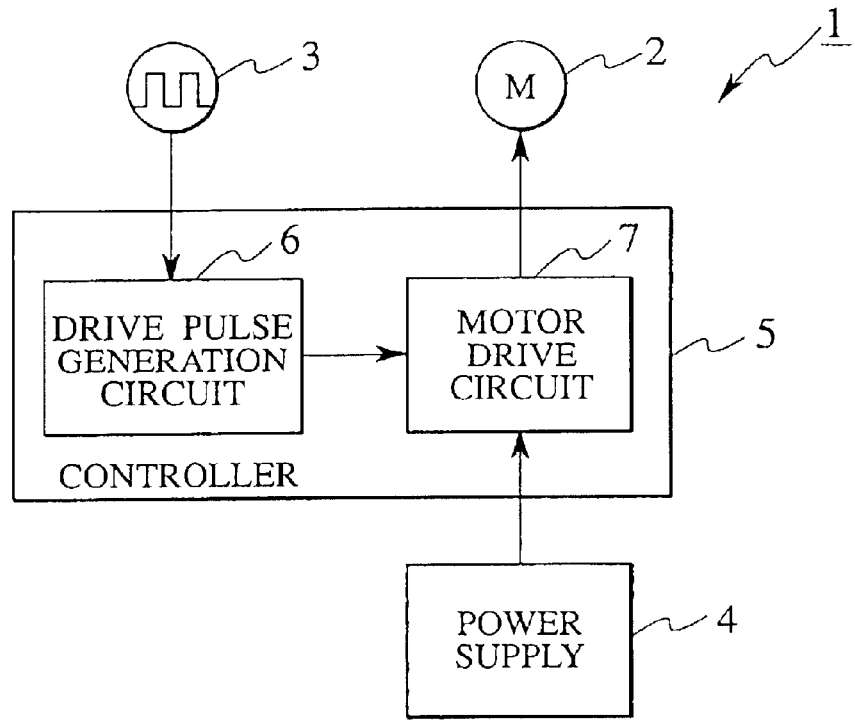
FIG. 3 is a block diagram schematically showing an automatic opening/closing device of a backdoor, to which the present invention is applied.

As shown in FIG. 3, an automatic opening/closing device (moving body drive control device) 1 of a backdoor, to which the present invention is applied, includes a motor 2 for driving the backdoor as a moving body, a rotary encoder 3 for detecting rotary pulses of the motor 2, a power supply 4, and a controller 5. Then, in the automatic opening/closing device 1 of the backdoor, the controller 5 includes a drive pulse generation circuit 6 for calculating the moving speed of the backdoor based on the rotary pulses of the motor 2, which is detected by the rotary encoder 3, and for generating drive pulses for approximating the moving speed of the backdoor to the specified target speed, and a motor drive circuit 7 for driving the motor 2 in accordance with the drive pulses generated by the drive pulse generation circuit 6.

Figure 4:
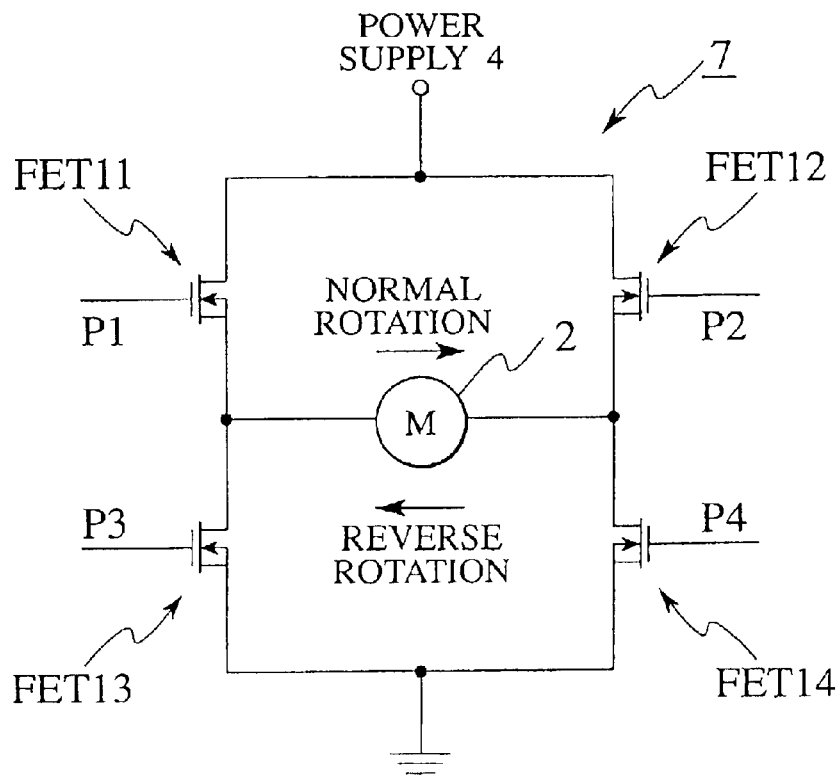
FIG. 4 is a circuit diagram showing one example of a motor drive circuit provided in the automatic opening/closing device of the backdoor.

As shown in FIG. 4, the motor drive circuit 7 has four MOS N-channel FETS (field-effect transistors) 11 to 14 connected to the motor 2.

Among these four FETS 11 to 14, the FET 11 and the FET 12 are connected to the power supply 4 with their drains made common thereto. Moreover, the FET 13 and FET 14 are connected to the ground with their sources made common thereto. Then, a source of the FET 11 and a drain of the FET 13 are connected to one terminal of the motor 2, and a source of the FET 12 and a drain of the FET 14 are connected to the other terminal of the motor 2. Furthermore, to gates of these four FETS 11 to 14, drive pulses P1 to P4 generated by the drive pulse generation circuit 6 are inputted, respectively.

ON/OFF of the four FETS 11 to 14 is controlled by the drive pulses P1 to P4, and thus this motor drive circuit 7 controls an energizing direction from the power supply 4 to the motor 2 to drive the motor 2 in the normal rotation or in the reverse rotation.

Namely, when the drive pulse P1 supplied to the FET 11 and the drive pulse P4 supplied to the FET 14 are at a Hi level and the drive pulse P2 supplied to the FET 12 and the drive pulse P3 supplied to the FET 13 are at a Lo level, the FET 11 and the FET 14 are turned ON, and the FET 12 and the FET 13 are turned OFF, and thus the motor 2 is driven in the normal rotation. Then, the motor 2 is driven in the normal rotation, and thus drive force will be applied to the backdoor as a moving body, for example, in an opening direction thereof.

Meanwhile, when the drive pulse P1 supplied to the FET 11 and the drive pulse P4 supplied to the FET 14 are at the Lo level and the drive pulse P2 supplied to the FET 12 and the drive pulse P3 supplied to the FET 13 are at the Hi level, the FET 11 and the FET 14 are turned OFF, and the FET 12 and the FET 13 are turned ON, and thus the motor 2 is driven in the reverse rotation. Then, the motor 2 is driven in the reverse rotation, and thus drive force will be applied to the backdoor as a moving body, for example, in a closing direction thereof.

Moreover, the ON/OFF of the four FETS 11 to 14 is controlled by the drive pulses P1 to P4 to make this motor drive circuit 7 as a closed circuit, and thus the motor drive circuit 7 sets the motor 2 in a dynamic braking state to apply a regenerative brake to the motor 2.

Namely, when the drive pulse P1 supplied to the FET 11 and the drive pulse P2 supplied to the FET 12 are at the Lo level and the drive pulse P3 supplied to the FET 13 and the drive pulse P4 supplied to the FET 14 are at the Hi level, The FET 11 and the FET 12 are turned OFF, the FET 13 and the FET 14 are turned On, and thus the closed circuit is constituted to turn the motor 2 into a normal rotation regenerative braking state. Then, when the motor 2 is set in the normal rotation regenerative braking state, braking force of suppressing the drive force, for example, in the opening direction will be applied to the backdoor as a moving body.

Moreover, when the drive pulse P1 supplied to the FET 11 and the drive pulse P2 supplied to the FET 12 are at the Hi level and the drive pulse P3 supplied to the FET 13 and the drive pulse P4 supplied to the FET 14 are at the Lo level, the FET 11 and the FET 12 are turned ON, and the FET 13 and the FET 14 are turned OFF, and thus the closed circuit is constituted to turn the motor 2 into a reverse rotation regenerative braking state. Then, when the motor 2 is set in the reverse rotation regenerative braking state, braking force of suppressing the drive force, for example, in the closing direction will be applied to the backdoor as a moving body.

Figure 5:
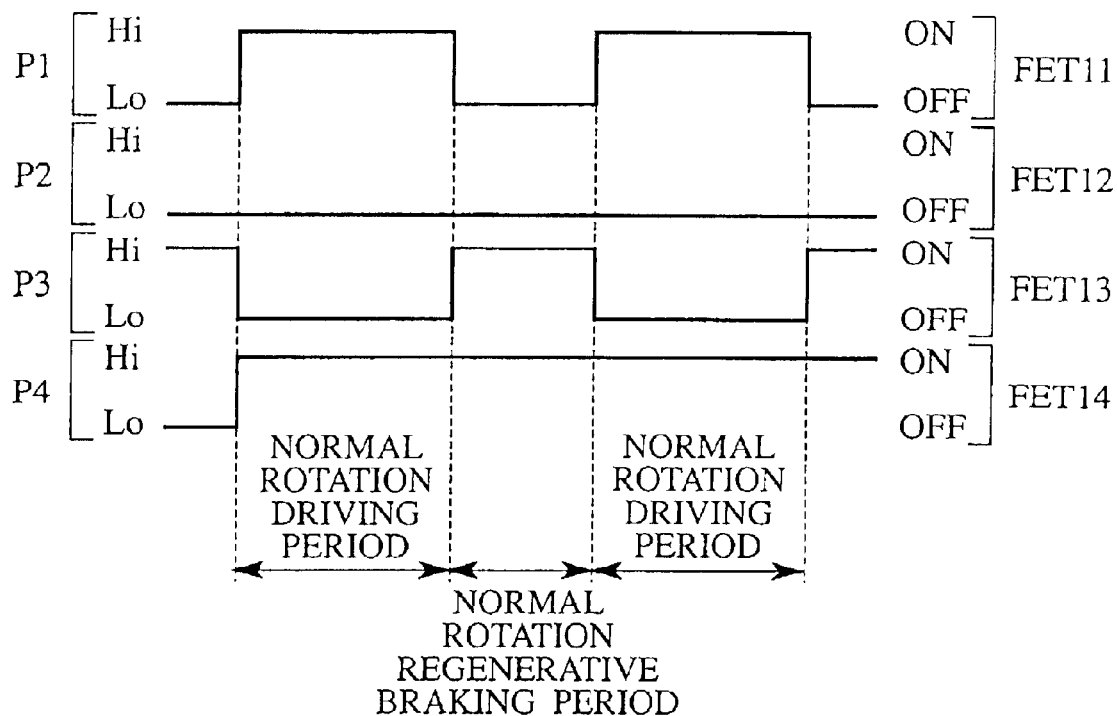
FIG. 5 is a timing chart showing an operation of the motor drive circuit, showing an example of alternating a normal rotation driving period and a normal rotation regenerative braking period.

Then, in the automatic opening/closing device 1 of the backdoor, to which the present invention is applied, when the backdoor is operated to move in the opening direction, for example, the ON/OFF of the FETS 11 to 14 of the motor drive circuit 7 is controlled as shown in a timing chart of FIG. 5, and thus the normal rotation driving state and the normal rotation regenerative braking state will be made to alternate with each other to apply the driving force and the braking force alternately to the backdoor by the motor 2. Then, the magnitude of the driving force in the normal rotation driving period and the magnitude of the braking force in the normal rotation regenerative braking period are adjusted individually, these magnitudes are mutually balanced, and thus the moving speed of the backdoor is adjusted so that the backdoor can open at the specified target speed.

Figure 6:
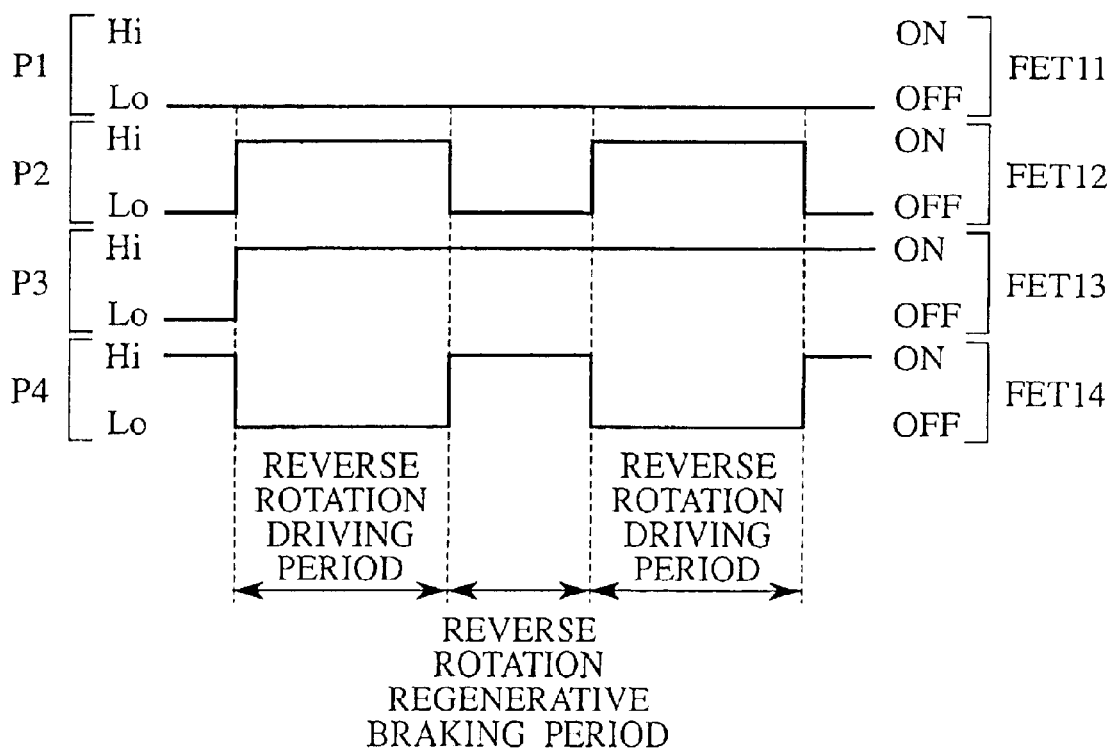
FIG. 6 is a timing chart showing an operation of the motor drive circuit, showing an example of alternating a reverse rotation driving period and a reverse rotation regenerative braking period.

Moreover, in the automatic opening/closing device 1 of the backdoor, to which the present invention is applied, when the backdoor is operated to move in the closing direction, for example, the ON/OFF of the FETS 11 to 14 of the motor drive circuit 7 is controlled as shown in a timing chart of FIG. 6, and thus the reverse rotation driving state and the reverse rotation regenerative braking state will be made to alternate with each other to apply the driving force and the braking force alternately to the backdoor by the motor 2. Then, the magnitude of the driving force in the reverse rotation driving period and the magnitude of the braking force in the reverse rotation regenerative braking period are adjusted individually, these magnitudes are mutually balanced, and thus the moving speed of the backdoor is adjusted so that the backdoor can close at the specified target speed.

As described above, in the automatic opening/closing device 1 of the backdoor, to which the present invention is applied, the backdoor is operated to move in both of the opening direction and the closing direction while the driving force and the braking force are being applied alternately thereto. Therefore, while the backdoor is moving, the driving load is always applied to the backdoor. Accordingly, the moving backdoor becomes hard to be affected by the disturbance such as a vibration and a wind, the moving speed of the backdoor is controlled appropriately without depending on a using environment thereof, and thus it is made possible to open/close the backdoor stably at the specified target speed.

Note that, when switching the normal rotation driving state and the normal rotation regenerative braking state, and when switching the reverse rotation driving state and the reverse rotation regenerative braking state, ill order to avoid inconvenience that these states are overlapped to cause an excessive load to the motor 2, the motor drive circuit 7 is turned into an open circuit momentarily to set the motor 2 in a free state. Accordingly, strictly speaking, the driving load is not applied to the backdoor during this moment. However, since this non-load state runs for an extremely short time such as 1 μsec. or less, this state is ignorable.

Moreover, in the automatic opening/closing device 1 of the backdoor, to which the present invention is applied, the magnitudes of the driving force in the normal rotation driving period and in the reverse rotation driving period and the magnitudes of the braking force in the normal rotation regenerative braking period and in the reverse rotation regenerative braking period are adjusted individually, and these driving force and braking force are mutually balanced. Thus, the moving speed of the backdoor is adjusted so as to be the specified target speed. Therefore, as compared with the case of performing the drive control and braking control of the backdoor separately, for example, as compared with the case of switching the drive control to the braking control when the moving speed of the backdoor exceeds the specified target speed even if the driving force is set at 0 during the drive control of the backdoor, the change in the number of revolutions of the motor 2 with respect to the torque change thereof is reduced. Accordingly, the number of revolutions of the motor 2 can be controlled finely, and thus it is made possible to control the moving speed of the backdoor highly precisely.

Incidentally, the magnitude of the driving force in the normal rotation driving period or in the reverse rotation driving period and the magnitude of the braking force in the normal rotation regenerative braking period or in the reverse rotation regenerative braking period can be adjusted by changing the time widths of the driving period and of the regenerative braking period. However, the time widths of the above-described driving period and of regenerative braking period are fixed, the PWM control is performed in the periods, the driving duty and the regenerative braking duty in the periods are changed, and thus the above-described magnitudes may be adjusted.

Figure 7:
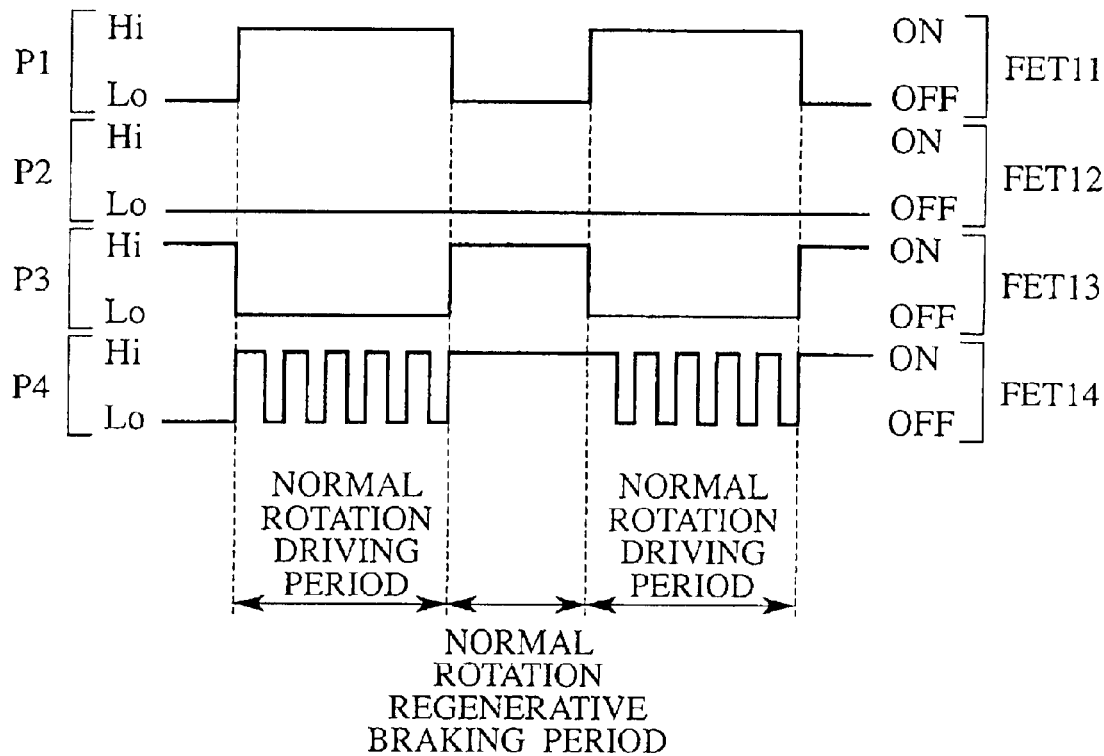
FIG. 7 is a timing chart showing an operation of the motor drive circuit, showing an example of performing PWM control during the normal rotation driving period.
Figure 8:
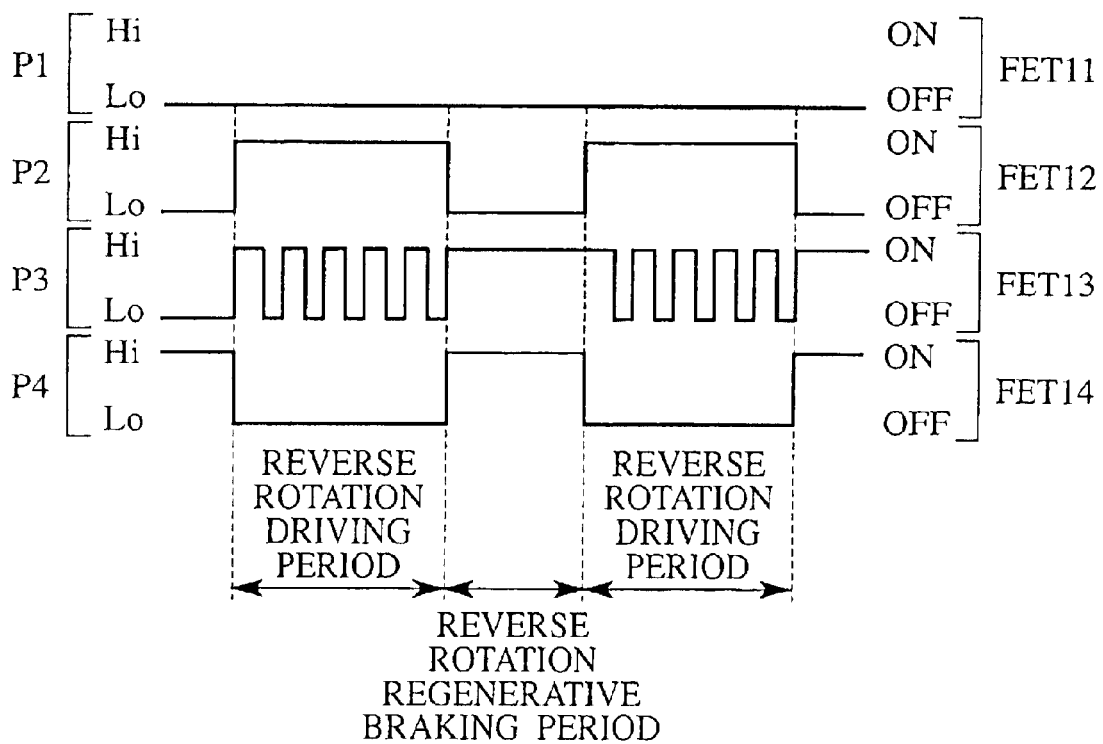
FIG. 8 is a timing chart showing an operation of the motor drive circuit, showing an example of performing the PWM control during the reverse rotation driving period.

Namely, as shown in a timing chart of FIG. 7, the drive pulse P4 subjected to the PWM control is supplied to the FET 14 in the normal rotation driving period, and thus the magnitude of the driving force in the normal rotation driving period can be adjusted. Moreover, as shown in a timing chart of FIG. 8, the drive pulse P3 subjected to the PWM control is supplied to the FET 13 in the reverse rotation driving period, and thus the magnitude of the driving force in the reverse rotation driving period can be adjusted.

Figure 9:
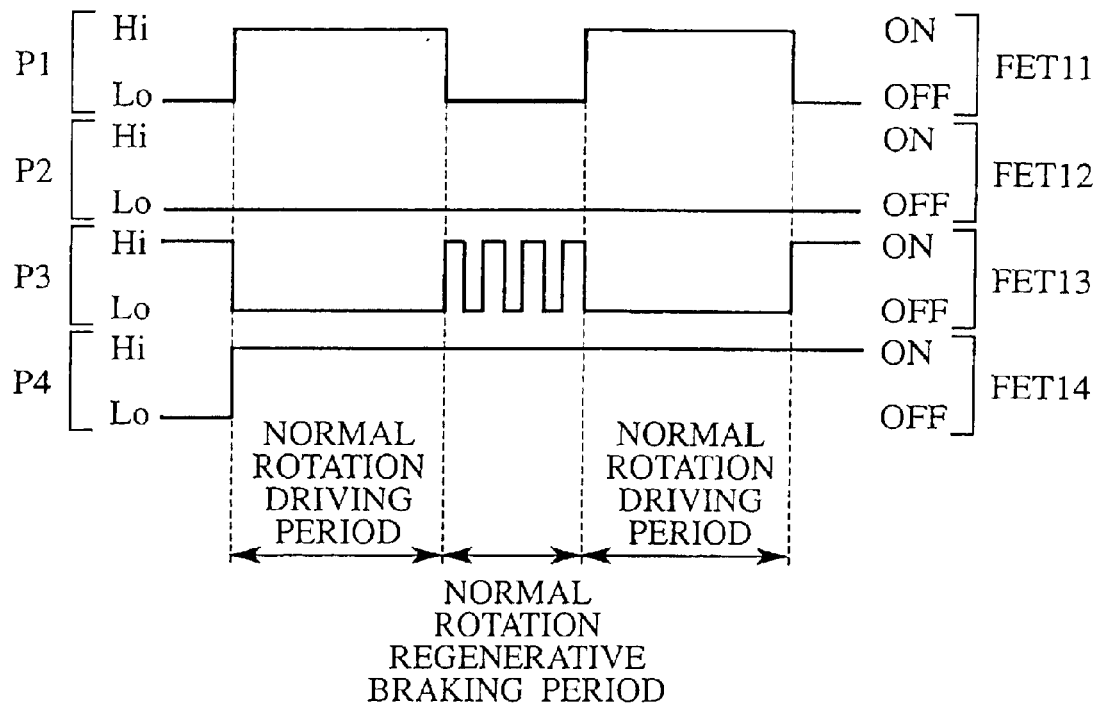
FIG. 9 is a timing chart showing an operation of the motor drive circuit, showing an example of performing the PWM control during the normal rotation regenerative braking period.
Figure 10:
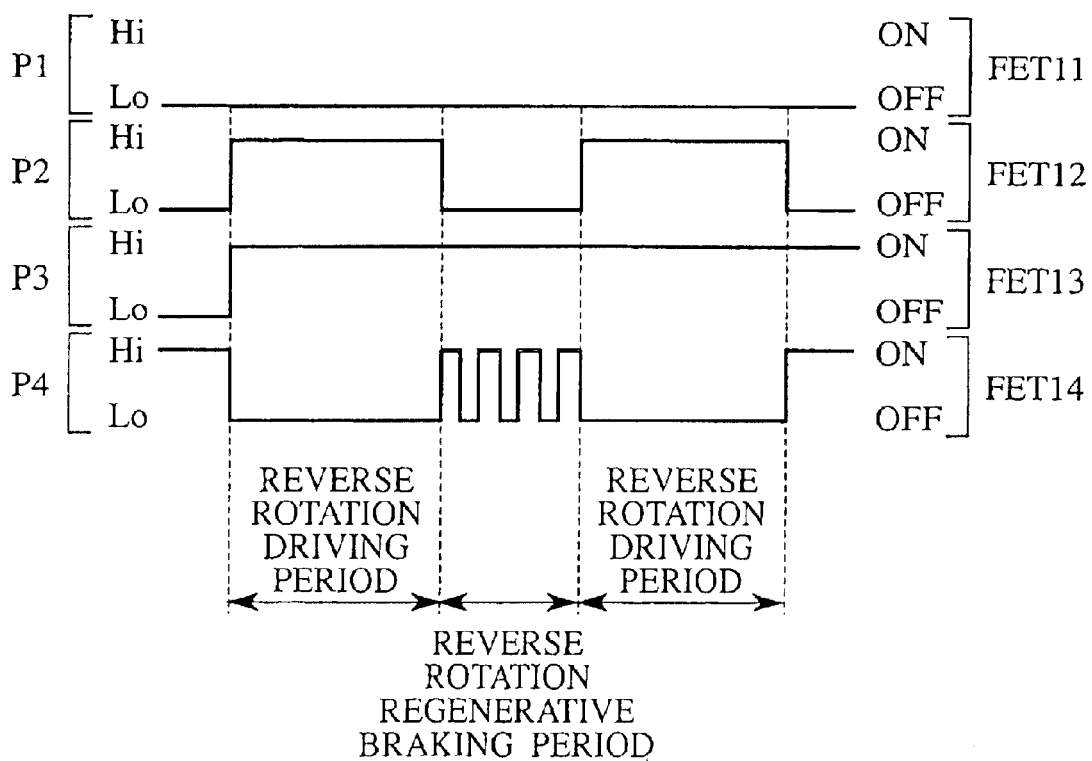
FIG. 10 is a timing chart showing an operation of the motor drive circuit, showing an example of performing the PWM control during the reverse rotation regenerative braking period.

Moreover, as shown in a timing chart of FIG. 9, the drive pulse P3 subjected to the PWM control is supplied to the FET 13 in the normal rotation regenerative braking period, and thus the magnitude of the braking force in the normal rotation regenerative braking period can be adjusted. Moreover, as shown in a timing chart of FIG. 10, the drive pulse P4 subjected to the PWM control is supplied to the FET 14 in the reverse rotation regenerative braking period, and thus the magnitude of the braking force in the reverse rotation regenerative braking period can be adjusted.

Then, the driving force in the driving period and the braking force in the regenerative braking period, both of which are adjusted as described above, are mutually balanced, and thus the adjustment is made possible so as to approximate the moving speed of the backdoor as a moving body when it is opened/closed automatically to the specified target speed.

As described above, by performing the PWM control in the driving period and in the regenerative braking period, and by changing the driving duty and the regenerative braking duty in these periods, thus the magnitude of the driving force ill the driving period and the magnitude of tie braking force in the regenerative braking period are adjusted. In such a case, power consumption of the motor 2 can be reduced. In addition, in such a case, the driving force and the braking force are adjusted finely, and thus it is made possible to control the moving speed of the backdoor as a moving body with higher precision.

Note that, when the PWM control is performed in the driving period and in the regenerative braking period, the state where the driving load is applied to the backdoor as a moving body and the non-load state where the driving load is not applied thereto will be successively switched in an extremely short cycle in the driving period and the regenerative braking period. Strictly speaking, the non-load state will be present in the driving period or in the regenerative braking period. However, the switching cycle as described above is extremely short, and a time interval of the non-load state is an extremely short. Therefore, it can be regarded that the driving load is always applied to the backdoor as a moving body in the driving period and the regenerative braking period.

In the automatic opening/closing device 1 of a backdoor, to which the present invention is applied, while the drive control of the backdoor, which is as described above, may be performed over the entire region of a moving range of the backdoor, the drive control may be performed only for a range where the moving speed of the backdoor is apt to be unstable. Namely, in a region where the moving speed of the backdoor can be stably controlled, the moving speed thereof is approximated to the target speed by the PWM control similarly to the conventional case. Moreover, in the region where the moving speed of the backdoor is apt to be unstable, the magnitude of the driving force and the magnitude of the braking force are mutually balanced while applying the driving force and the braking force alternately to the backdoor, and thus the moving speed of the backdoor may be approximated to the target speed.

Next, description will be made for another example of the automatic opening/closing device of a backdoor, to which the present invention is applied, with reference to FIGS. 11 to 18. The automatic opening/closing device of the backdoor, which is described here, is the one using two motors 2a and 2b as the motor for driving the backdoor. Specifically, while one motor 2a is being set in the driving state, the other motor 2b is set in the regenerative braking state, and thus the driving force and the braking force are applied simultaneously to the backdoor. Then, in this automatic opening/closing device of a backdoor, the driving force of the one motor 2a and the braking force of the other motor 2b are mutually balanced, and thus the moving speed of the backdoor is approximated to the target speed.

Figure 11:
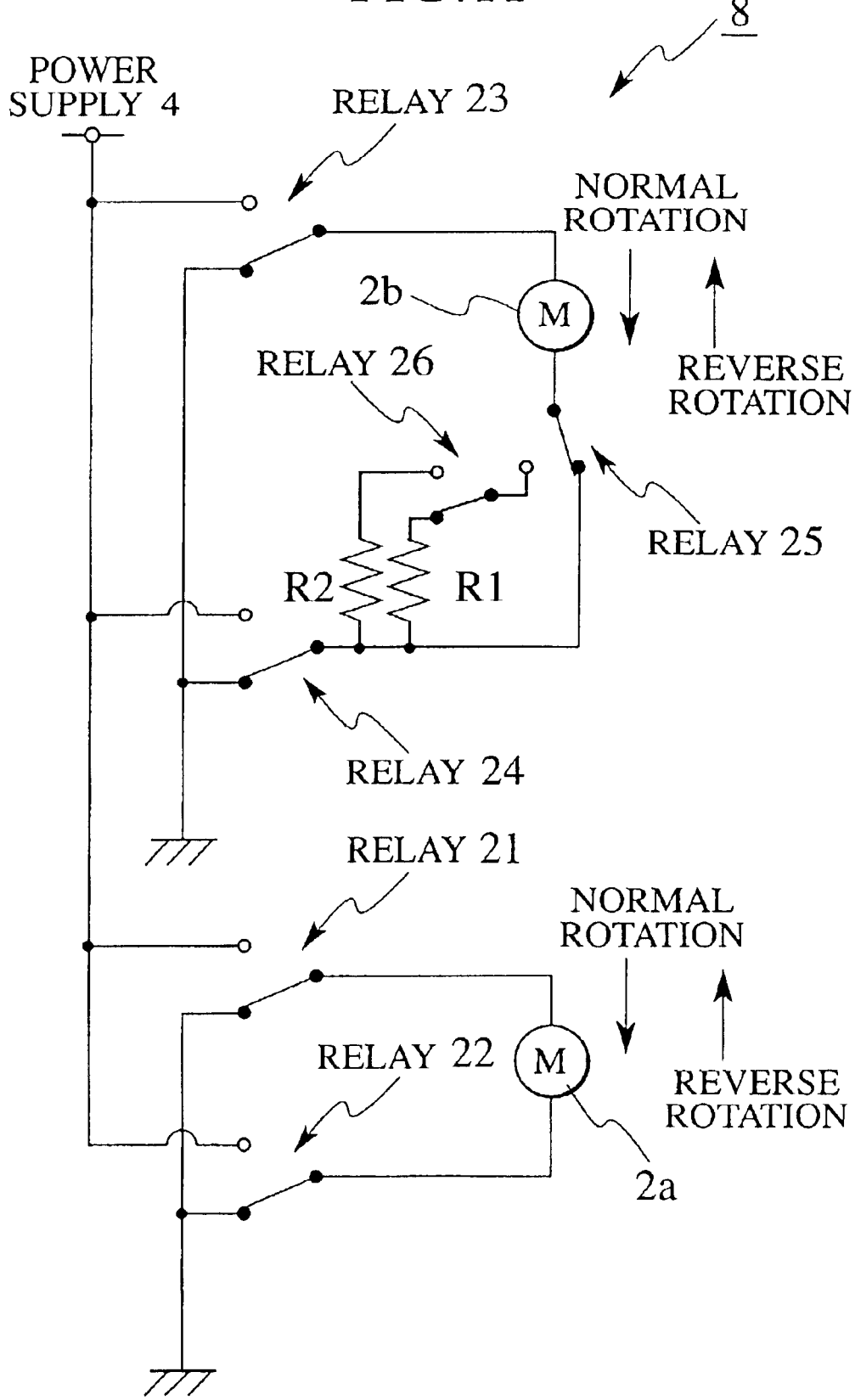
FIG. 11 is an explanatory diagram of another example of the automatic opening/closing device of a backdoor, to which the present invention is applied, and also a circuit diagram showing one example of a motor drive circuit provided in this automatic opening/closing device of the backdoor.

This automatic opening/closing device of the backdoor includes a motor drive circuit 8, for example, as shown in FIG. 11, instead of the motor drive circuit 7 provided in the above-described automatic opening/closing device 1 of the backdoor.

In the motor drive circuit 8 shown in FIG. 11, ON/OFF of a relay 21 and a relay 22 is switched, and thus the motor 2a is driven in the normal rotation or in the reverse rotation. Moreover, in the motor drive circuit 8, ON/OFF of a relay 23 and a relay 24 is switched, and thus the motor 2b is driven in the normal rotation or in the reverse rotation, and the regenerative brake is applied to the motor 2b. Furthermore, in the motor drive circuit 8, ON/OFF of a relay 25 and a relay 26 is switched, and thus the magnitude of the braking force by the regenerative brake is switched at three stages.

Figure 12:
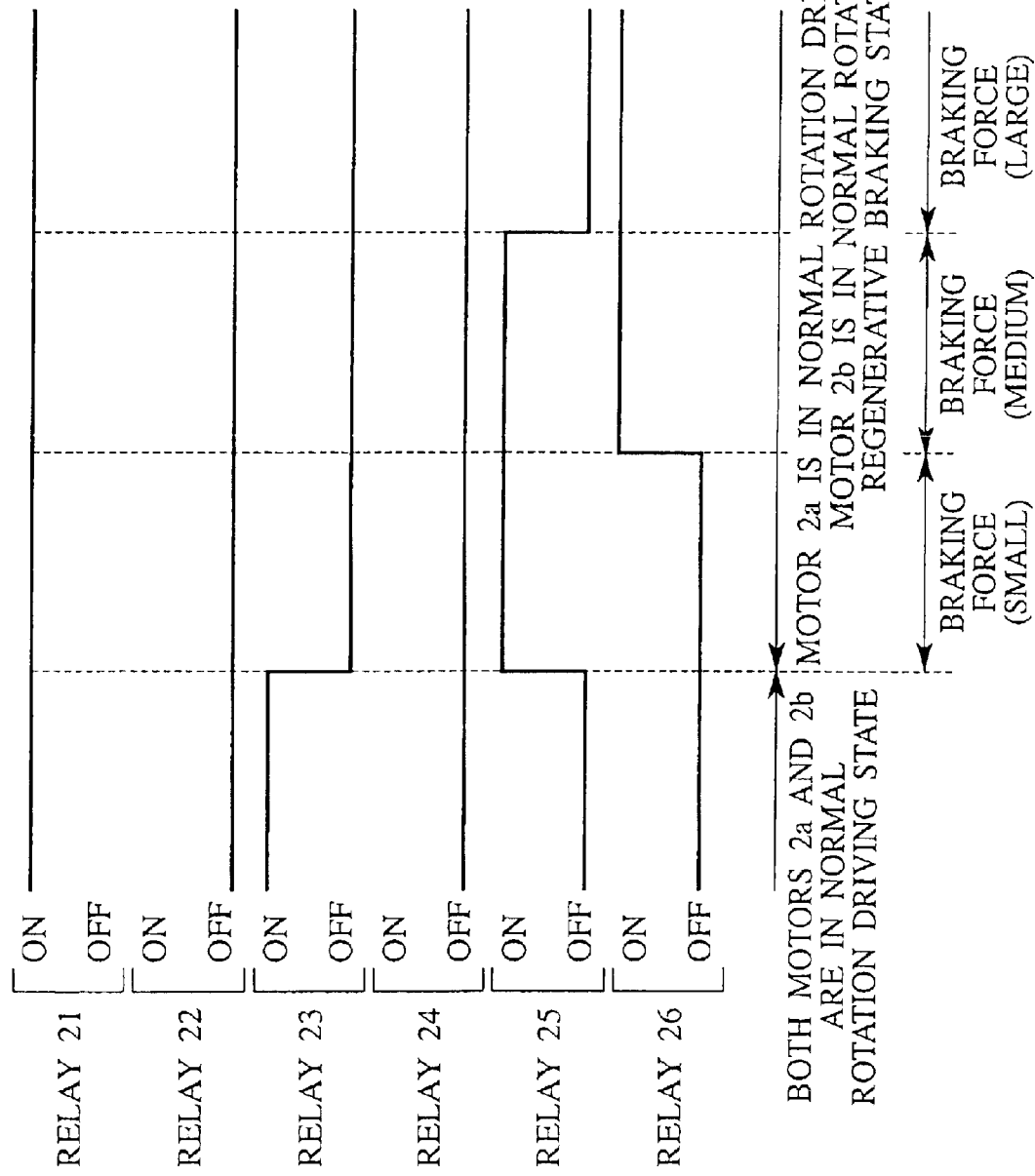
FIG. 12 is a timing chart showing an operation of the motor drive circuit, showing an example where one motor is set in the normal rotation driving state and the other motor is set in the normal rotation regenerative braking state.

Concretely, for example, as shown in a timing chart of FIG. 12, the relay 21 is turned ON, and the relay 22 is turned OFF, and thus the motor 2a is set in the normal rotation driving state. Moreover, the relay 23 is turned ON, the relay 24 is turned OFF, and thus the motor 2b is set in the normal rotation driving state. Namely, in this period, both of the two motors 2a and 2b are set in the normal rotation driving state.

In this case, when the relay 23 is turned OFF, a closed circuit is constituted between the relay 23 and the relay 24, and the motor 2b is set in a dynamic braking state, and thus the regenerative brake will be applied to the motor 2b. Namely, in this period, the one motor 2a is set in the normal rotation driving state, and the other motor 2b is set in the normal rotation regenerative braking state. Thus, the driving force by the motor 2a and the braking force by, the motor 2b will be applied simultaneously to the backdoor.

Figure 13:
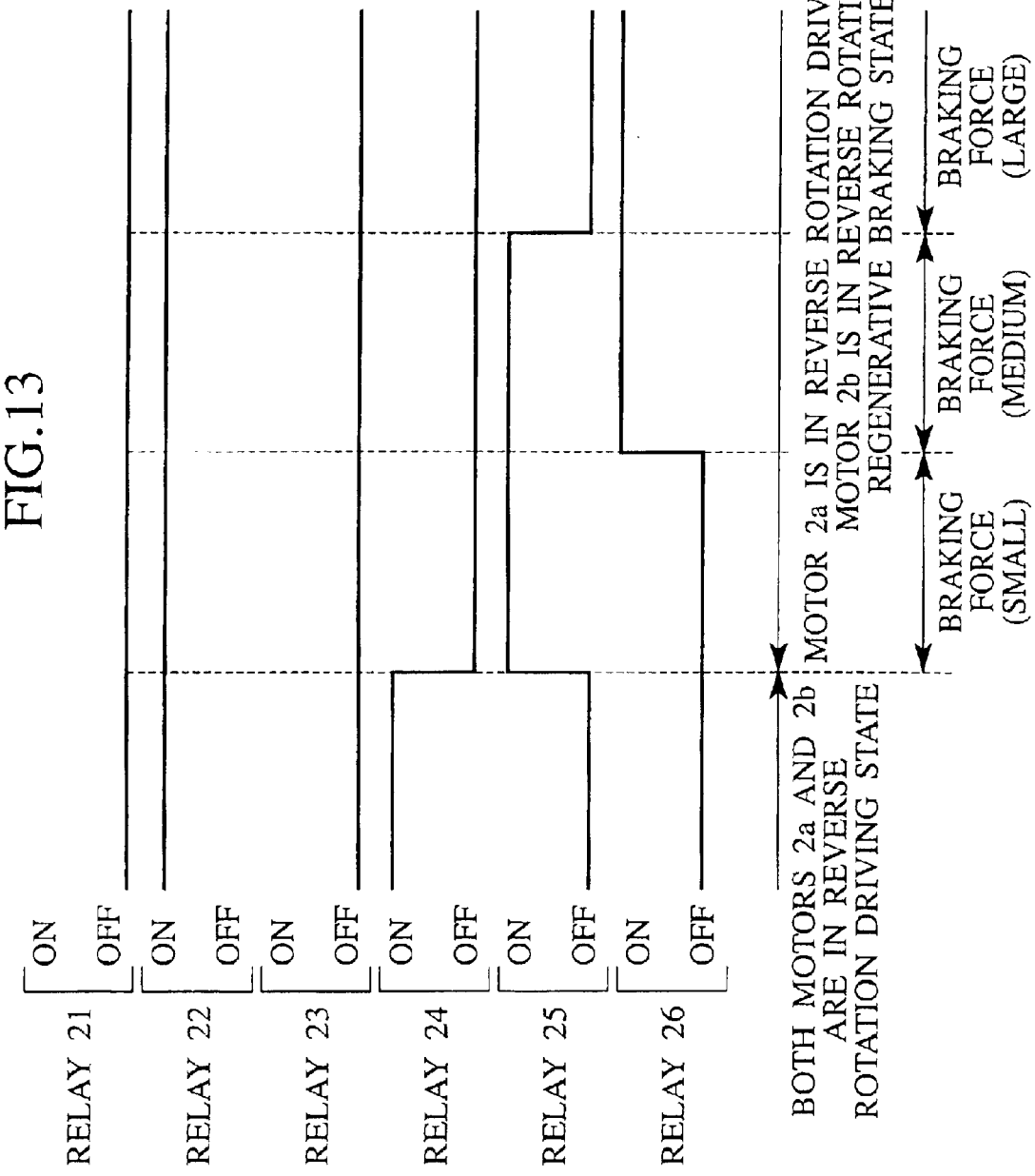
FIG. 13 is a timing chart showing an operation of the motor drive circuit, showing an example where one motor is set in the reverse rotation driving state and the other motor is set in the reverse rotation regenerative braking state.

Moreover, for example, as shown in a timing chart of FIG. 13, the relay 21 is turned OFF, the relay 22 is turned ON, and thus the motor 2a is set in the reverse rotation driving state. Moreover, the relay 23 is turned OFF, the relay 24 is turned ON, and thus the motor 2b is set in the reverse rotation driving state. Namely, in this period, both of the two motors 2a and 2b are set in the reverse rotation driving state.

In this case, when the relay 24 is turned OFF, a closed circuit is constituted between the relay 23 and the relay 24, and the motor 2b is set in the dynamic braking state, and thus the regenerative brake will be applied to the motor 2b. Namely, in this period, the one motor 2a is set in the reverse rotation driving state, and the other motor 2b is set in the reverse rotation regenerative braking state. Thus, the driving force by the motor 2a and the braking force by the motor 2b will be applied simultaneously to the backdoor.

When the motor 2b is set in the regenerative braking state, the braking force by the regenerative brake of the motor 2b will be switched at three stages by switching ON/OFF of the relay 25 and the relay 26. Namely, when the relay 25 is turned ON and the relay 26 is turned OFF, a closed circuit having a resistor R1 with a large resistance value will be constituted, and the braking force by the regenerative brake of the motor 2b is relatively small. Moreover, when both of the relay 25 and the relay 26 are turned ON, a closed circuit having a resistor R2 with a resistance value smaller than that of the resistor R1 will be constituted. Consequently, the braking force by the regenerative brake of the motor 2b becomes larger as compared with the case of turning ON the relay 25 and turning OFF the relay 26. Moreover, when the relay 25 is turned OFF, a closed circuit without the resistor R1 or R2, that is, a circuit with an extremely small resistance value will be constituted, and the braking force by the regenerative brake of the motor 2b becomes extremely large.

In the automatic opening/closing device of the backdoor in this example, while the driving force by the motor 2a and the braking force by the motor 2b are being applied simultaneously to the backdoor as a moving body, the magnitude of the braking force by the motor 2b is adjusted according to the method as described above. Thus, the braking force and the driving force, which are applied to the backdoor, are mutually balanced, and thus the moving speed of the backdoor is approximated to the specified target speed. Thus, similarly to the above-described automatic opening/closing device 1 of the backdoor, the moving speed of the backdoor can be controlled stably and highly precisely.

Figure 14:
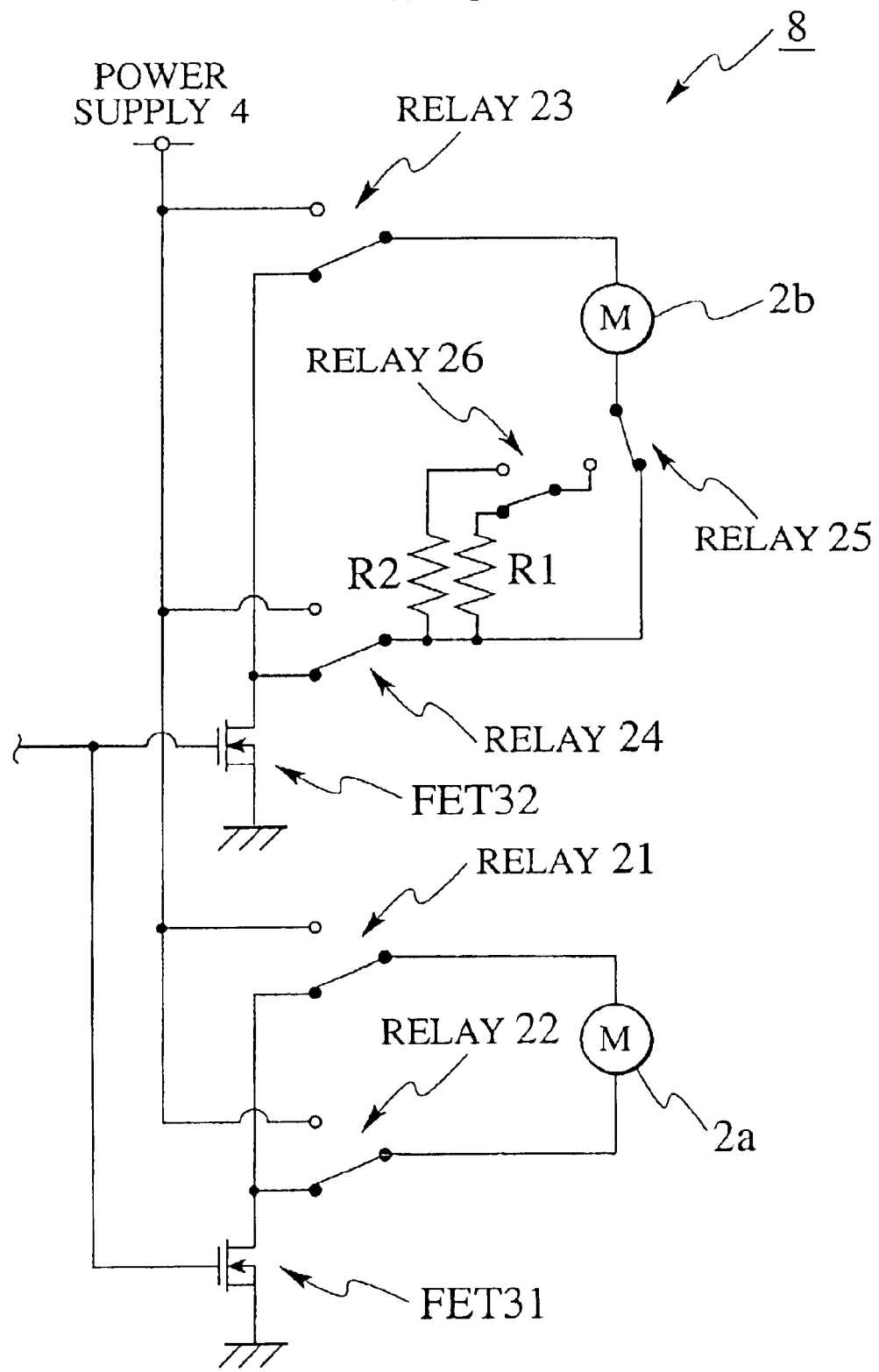
FIG. 14 is a circuit diagram showing a modification example made capable of adjusting a magnitude of the driving force in the motor drive circuit.

Note that, in the automatic opening/closing device of the backdoor in this example, the case is conceived, where not only the magnitude of the braking force but also the magnitude of the driving force is adjusted to mutually balance the driving force and the braking force, which are applied to the backdoor. Then, as shown in FIG. 14, satisfactorily, an FET 31 may be connected between the relay 22 and the ground, an FET 32 may be connected between the relay 24 and the ground, and drive pulses subjected to the PWM control may be supplied to the FET 31 and the FET 32. Thus, the magnitude of the driving force will be adjusted by controlling the driving duty. As described above, when not only the magnitude of the braking force but also the magnitude of the driving force is adjusted to mutually balance the driving force and the braking force, which are applied to the backdoor, it is made possible to control the moving speed of the backdoor as a moving body with higher precision.

Figure 15:
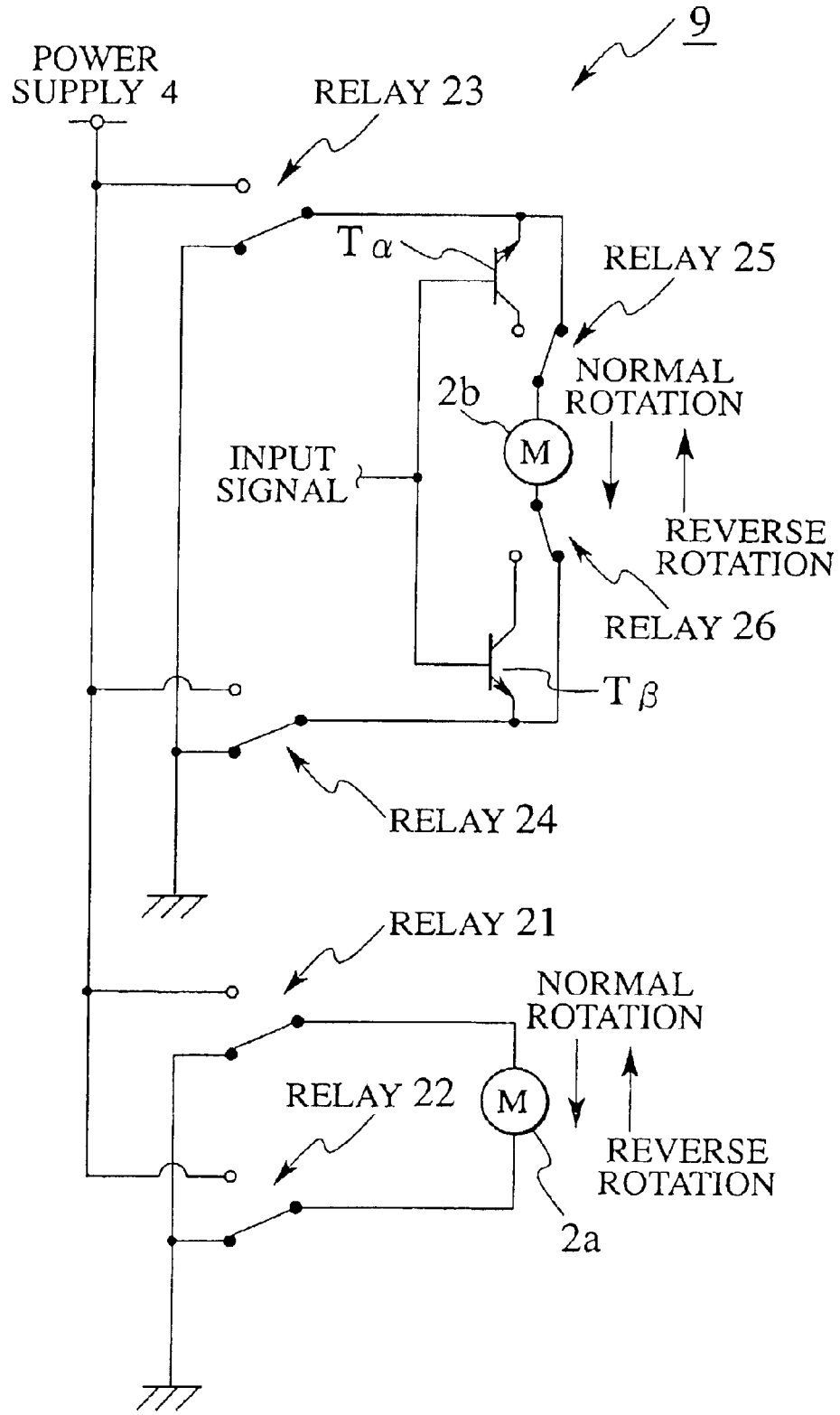
FIG. 15 is a circuit diagram showing another example of the motor drive circuit.

Moreover, in the automatic opening/closing device of the backdoor in this example, for example, the motor drive circuit may be constituted as shown in FIG. 15.

In a motor drive circuit 9 shown in FIG. 15, instead of the resistors R1 and R2 provided in the motor drive circuit 8 shown in FIG. 11 and FIG. 14, transistors Tα and Tβ are provided. Levels of input signals supplied to the transistors Tα and Tβ are adjusted, and thus the magnitude of the braking force by the regenerative brake of the motor 2b can be adjusted in an analogical manner. As described above, if the magnitude of the braking force by the regenerative brake of the motor 2b is adjusted in the analogical manner, then it is made possible to control the moving speed of the backdoor as a moving body with higher precision.

Figure 16:
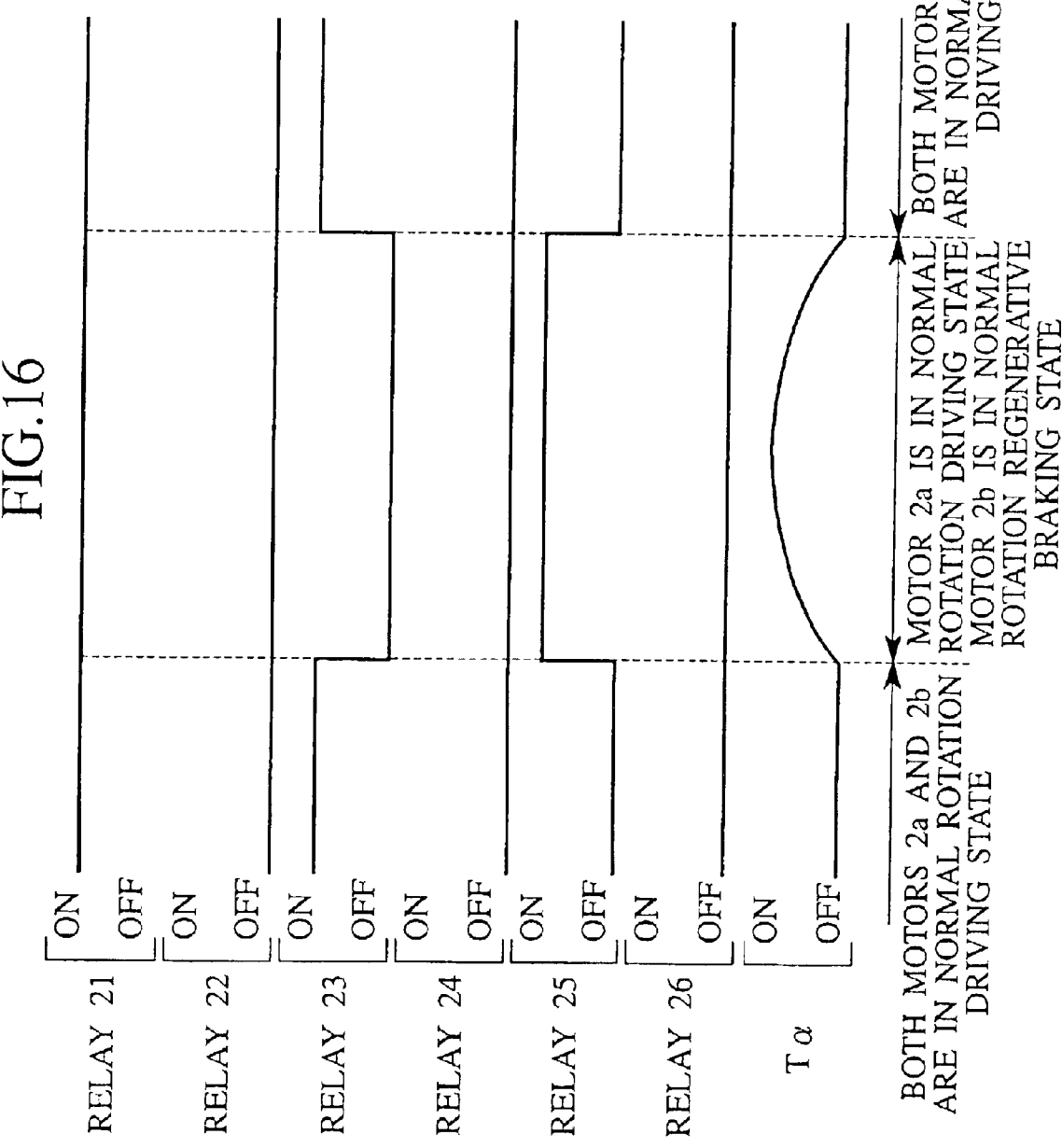
FIG. 16 is a timing chart showing an operation of the other motor drive circuit, showing an example where one motor is set in the normal rotation driving state and the other motor is set in the normal rotation regenerative braking state.

Concretely describing, in this motor drive circuit 9, for example, as shown in a timing chart of FIG. 16, the relay 21 is turned ON, the relay 22 is turned OFF, and thus the motor 2a is set in the normal rotation driving state. Moreover, the relay 23 is turned ON, the relay 24 is turned OFF, and thus the motor 2b is set in the normal rotation driving state. Namely, in this period, both of the two motors 2a and 2b are set in the normal rotation driving state.

In this case, if the relay 23 is turned OFF, the relay 25 is turned ON, and the relay 26 is turned OFF, then the motor 2b is set in the normal rotation regenerative braking state. Namely, in this period, the one motor 2a is set in the normal rotation driving state, and the other motor 2b is set in the normal rotation regenerative braking state. Then, when the motor 2b is set in the normal rotation regenerative braking state as described above, the level of the input signals supplied to the transistor Tα is adjusted, and thus the magnitude of the braking force by the regenerative brake of the motor 2b will be adjusted in the analogical manner.

Figure 17:
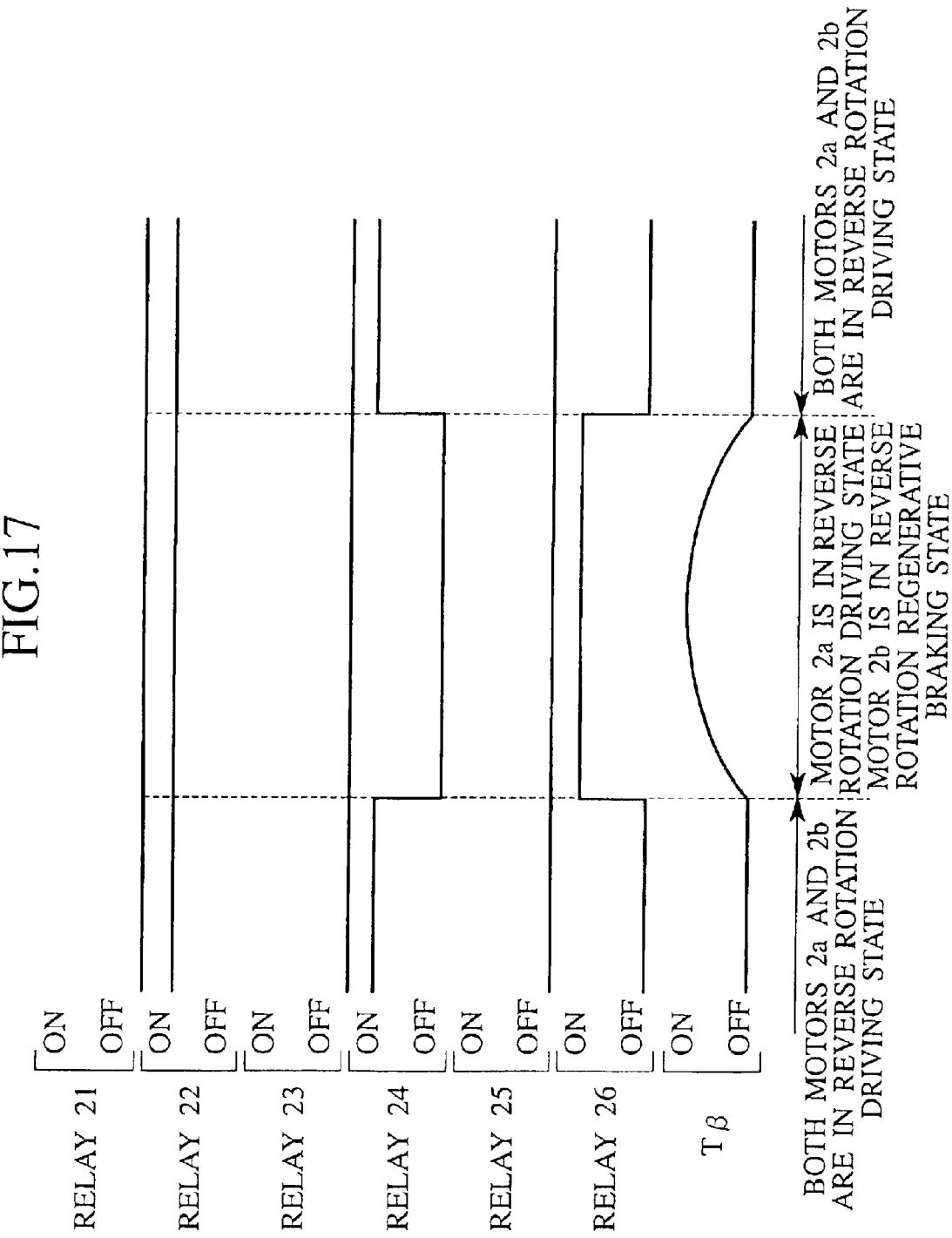
FIG. 17 is a timing chart showing an operation of the other motor drive circuit, showing an example where the one motor is set in the reverse rotation driving state and the other motor is set in the reverse rotation regenerative braking state.

Moreover, in this motor drive circuit 9, for example, as shown in a timing chart of FIG. 17, the relay 21 is turned OFF, the relay 22 is turned ON, and thus the motor 2a is set in the reverse rotation driving state. Furthermore, the relay 23 is turned OFF, the relay 24 is turned ON, and thus the motor 2b is set in the reverse rotation driving state. Namely, in this period, both of the two motors 2a and 2b are set in the reverse rotation driving state.

In this case, if the relay 24 is turned OFF, the relay 25 is turned OFF, and the relay 26 is turned ON, then the motor 2b is set in the reverse rotation regenerative braking state. Namely, in this period, the one motor 2a is set in the reverse rotation driving state, and the other motor 2b is set in the reverse rotation regenerative braking state. Then, when the motor 2b is set in the reverse rotation regenerative braking state as described above, the level of the input signals supplied to the transistor Tβ is adjusted, and thus the magnitude of the braking force by the regenerative brake of the motor 2b will be adjusted in the analogical manner.

Figure 18:
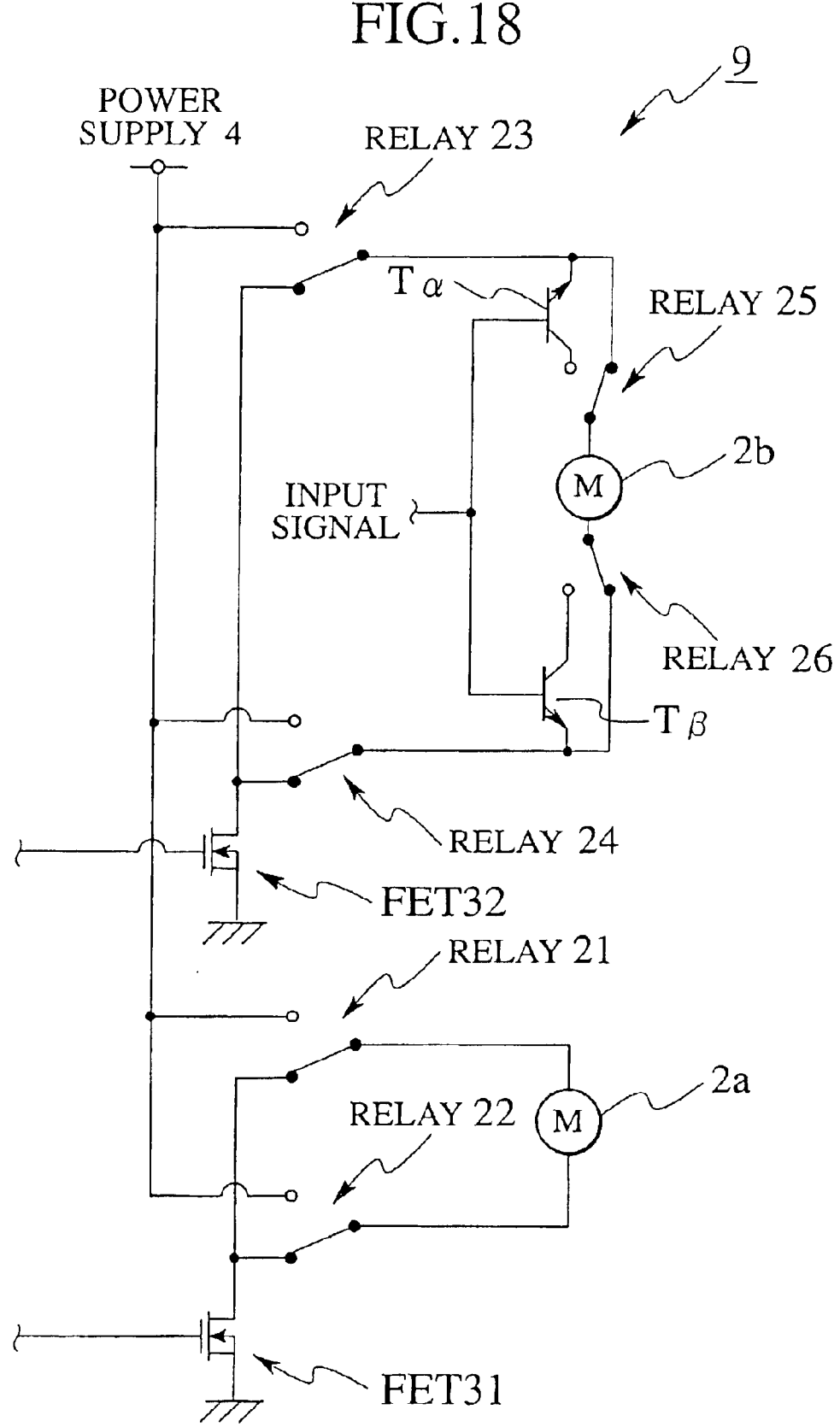
FIG. 18 is a circuit diagram showing a modification example made capable of adjusting the magnitude of the driving force in the other motor drive circuit.

Note that, also in this motor drive circuit 9, as shown in FIG. 18, the FET 31 is connected between the relay 22 and the ground, the FET 32 is connected between the relay 24 and the ground, and the drive pulses subjected to the PWM control are supplied to the FET 31 and the FET 32. In such a manner, the driving duties of the motors 2a and 2b are controlled, and the magnitude of the driving force will be adjusted. As described above, when not only the magnitude of the braking force but also the magnitude of the driving force is adjusted to mutually balance the driving force and the braking force, which are applied to the backdoor, it is made possible to control the moving speed of the backdoor as a moving body with higher precision.

Moreover, though the two motors 2a and 2b are used as the motor for driving the backdoor in the above example, a similar effect can be obtained also when three or more motors are used, and while at least one thereof is being set in the driving state, at least another thereof is set in the regenerative braking state, and thus the driving force and the braking force are applied simultaneously to the backdoor.

As above, description has been concretely made for the examples where the present invention is applied to the automatic opening/closing device of a backdoor. However, the present invention is not limited to the above examples. For example, it is possible to apply the present invention effectively to an automatic opening/closing device of a slide door for opening/closing a vehicular slide door automatically at a specified target speed. Moreover, not being limited to a vehicular door, it is possible to apply the present invention widely to a moving body drive control device for controlling drive of every moving body driven by a motor.

What is claimed is:

1. A moving body drive control device for controlling drive of a moving body driven by at least a first motor and a second motor to move the moving body at a specified target speed.

the drive control device comprising:
   a detector detecting a velocity of the moving body;
   a first motor driving circuit forming a circuit that determines a direction of current flow of the first motor by a combination of ON/OFF state of switches;
   a second motor driving circuit forming a circuit that determines a direction of current flow of the second motor by a combination of ON/OFF state of switches; and
   a controller controlling the first and second motor driving circuits;
   wherein the controller controls the first and second motor driving circuits based on detection of the detector such that the controller brings one of the first and second motor driving circuits into operation as a power source and the other of the first and second motor driving circuits into operation as a regenerative brake for reducing the velocity of the moving body,
   wherein the controller further comprises a pulse generating circuit for generating a first pulse for controlling the first motor and a second pulse for controlling the second motor based on detection of the detector; and
   wherein the controller controls a length of actuating time that the first and second motors are actuated as the power source and the regenerative brake by controlling a pulse-length being input to the first and second motors by using a pulse-width modulation control.

2. The moving body drive control device according to claim 1, further comprising:
   a first pulse switch connected to the first motor driving circuit; and a second pulse switch connected to the second motor driving circuit;

wherein the first pulse and the second pulse generated by the pulse generating circuit are respectively provided to the first pulse switch and the second pulse switch so as to actuate the first motor and the second motor.

3. A moving body drive control device for controlling drive of a moving body driven by at least a first motor and a second motor to move the moving body at a specified target speed, the drive control device comprising:

a detector detecting a velocity of the moving body;

a first motor driving circuit forming a circuit that determines a direction of current flow of the first motor by a combination of ON/OFF state of switches;

a second motor driving circuit forming a circuit that determines a direction of current flow of the second motor by a combination of ON/OFF state of switches; and a controller controlling the first and second motor driving circuits;

wherein the controller controls the first and second motor driving circuits based on detection of the detector such that the controller brings one of the first and second motor driving circuits into operation as a lower source and the other of the first and second motor driving circuits into operation as a regenerative brake for reducing the velocity of the moving body, wherein the first motor driving circuit further comprises a braking force adjustment circuit having at least a switch and a register connected to the switch; and wherein the controller can select the switch to connect the first motor to the register so as to adjust the magnitude of a braking force when the first motor is actuated as a regenerative brake.

4. The moving body drive control device according to claim 3, wherein the register further comprises at least two registers having different resistance values; and wherein the switch comprises a relay selectively connecting one of the registers to the first motor in response to a signal from the controller.

5. A moving body drive control device for controlling drive of a moving body driven by at least a first motor and a second motor to move the moving body at a specified target speed, the drive control device comprising:

a detector detecting a velocity of the moving body;

a first motor driving circuit forming a circuit that determines a direction of current flow of the first motor by a combination of ON/OFF state of switches;

a second motor driving circuit forming a circuit that determines a direction of current flow of the second motor by a combination of ON/OFF state of switches; and a controller controlling the first and second motor driving circuits;

wherein the controller controls the first and second motor driving circuits based on detection of the detector such that the controller brings one of the first and second motor driving circuits into operation as a power source and the other of the first and second motor driving circuits into operation as a regenerative brake for reducing the velocity of the moving body, wherein the first motor driving circuit further comprises a torque adjustment circuit having a first and second transistors, a first relay which connects the first transistor to the first motor, and a second relay which connects the second transistor to the first motor; and wherein the controller adjusts a torque of the first motor by selectively connecting either one of the first relay or the second relay to the first motor when the first motor is in a normal rotation driving state or in a reverse rotation driving state.

* * * * *